US012656932B2

(12) United States Patent
Chen et al.

(10) Patent No.: US 12,656,932 B2
(45) Date of Patent: Jun. 16, 2026

(54) INTERFACE DISPLAY METHOD AND APPARATUS, ELECTRONIC DEVICE AND STORAGE MEDIUM

(71) Applicant: Beijing Zitiao Network Technology Co., Ltd., Beijing (CN)

(72) Inventors: Yepeng Chen, Beijing (CN); Xu Li, Beijing (CN); Xiaoyi Sun, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 136 days.

(21) Appl. No.: 18/571,077

(22) PCT Filed: Aug. 25, 2022

(86) PCT No.: PCT/CN2022/114719
§ 371 (c)(1),
(2) Date: Dec. 15, 2023

(87) PCT Pub. No.: WO2023/035958
PCT Pub. Date: Mar. 16, 2023

(65) Prior Publication Data
US 2024/0288986 A1 Aug. 29, 2024

(30) Foreign Application Priority Data
Sep. 7, 2021 (CN) .......................... 202111044344.9

(51) Int. Cl.
*G06F 3/048* (2013.01)
*G06F 3/04815* (2022.01)
(Continued)

(52) U.S. Cl.
CPC ........ *G06F 3/04815* (2013.01); *G06F 3/0482* (2013.01); *G06F 3/0484* (2013.01);
(Continued)

(58) Field of Classification Search
CPC .. G06F 3/04815; G06F 3/0482; G06F 3/0484; G06F 3/1423; G06F 2203/04802;
(Continued)

(56) References Cited

U.S. PATENT DOCUMENTS 7,149,665 B2 * 12/2006 Feld ...................... G06Q 30/02
703/2
10,546,433 B2 * 1/2020 Lin ........................... G06T 7/62
(Continued)

FOREIGN PATENT DOCUMENTS

CN          103853452 A      6/2014
CN          303190330 S      4/2015
(Continued)

OTHER PUBLICATIONS

Guochun, Nie, "Dewu APP Launches AR virtual try-on" Feature China Consumer Network, Available online at <https://www.ccn.com.cn/Content/2020/07-29/1628014146.html>, Apr. 26, 2020, 6 pages.
(Continued)

*Primary Examiner* — Vijay Shankar
(74) *Attorney, Agent, or Firm* — Astute IP Law Group

(57) ABSTRACT

An interface display method and apparatus, an electronic device, and a storage medium. The interface display method includes: displaying a curved interface in response to a preset operation, the curved interface including at least one piece of first item information; and controlling the at least one piece of first item information moving along a set direction in response to a trigger operation acting on the curved interface.

18 Claims, 6 Drawing Sheets displaying a curved interface in response to a preset operation, the curved interface including at least one piece of first item information ⟩ ~ 110 controlling the at least one piece of first item information moving along a set direction in response to a trigger operation acting on the curved interface ⟩ ~ 120

(51) Int. Cl.

| | |
|---|---|
| *G06F 3/0482* | (2013.01) |
| *G06F 3/0484* | (2022.01) |
| *G06F 3/14* | (2006.01) |
| *G06T 17/20* | (2006.01) |
| *G06T 19/00* | (2011.01) |

(52) U.S. Cl.
CPC ............ *G06F 3/1423* (2013.01); *G06T 17/20* (2013.01); *G06T 19/006* (2013.01); *G06T 2200/24* (2013.01)

(58) Field of Classification Search
CPC ....... G06F 9/451; G06T 17/20; G06T 19/006; G06T 2200/24; G06T 19/20; G06Q 30/0601

See application file for complete search history.

(56) References Cited

U.S. PATENT DOCUMENTS

| | | | | |
|---|---|---|---|---|
| 10,872,322 | B2 * | 12/2020 | Siddique | ............ G06Q 30/0643 |
| 11,062,508 | B1 * | 7/2021 | Moody | ................... G06F 18/22 |
| 12,017,142 | B2 * | 6/2024 | Kanani | ................ G06N 3/0455 |
| 2001/0026272 | A1 * | 10/2001 | Feld | ....................... A41H 3/007 |
| | | | | 345/585 |

| | | | | |
|---|---|---|---|---|
| 2014/0368499 | A1 | 12/2014 | Kaur | |
| 2016/0210602 | A1 * | 7/2016 | Siddique | ................ G16H 10/60 |
| 2018/0300791 | A1 * | 10/2018 | Ganesan | ............ G06Q 30/0601 |
| 2019/0043269 | A1 * | 2/2019 | Lin | ............................ G06T 7/62 |
| 2019/0392553 | A1 | 12/2019 | Fox | |
| 2020/0027155 | A1 * | 1/2020 | Frakes | ................... G06Q 30/06 |
| 2022/0237812 | A1 * | 7/2022 | Chen | ......................... G06T 7/11 |
| 2022/0258049 | A1 * | 8/2022 | Kanani | .............. G06Q 30/0621 |
| 2023/0394537 | A1 * | 12/2023 | Ghorbani | .............. G06V 20/64 |

FOREIGN PATENT DOCUMENTS

| | | |
|---|---|---|
| CN | 104657063 A | 5/2015 |
| CN | 106530036 A | 3/2017 |
| CN | 108958568 A | 12/2018 |
| CN | 109189541 A | 1/2019 |
| CN | 110021057 A | 7/2019 |
| CN | 111210498 A | 5/2020 |
| CN | 111541907 A | 8/2020 |

OTHER PUBLICATIONS

Office Action for Chinese Patent Application No. 202111044344.9, mailed on Apr. 28, 2026, 13 pages.

* cited by examiner displaying a curved interface in response to a preset operation, the curved interface including at least one piece of first item information ~110 controlling the at least one piece of first item information moving along a set direction in response to a trigger operation acting on the curved interface ~120

210

INTERFACE DISPLAY METHOD AND APPARATUS, ELECTRONIC DEVICE AND STORAGE MEDIUM

CROSS-REFERENCE TO RELATED APPLICATIONS

This application is a U.S. National Stage Application based on International Patent Application No. PCT/CN2022/114719, filed on Aug. 25, 2022, which claims priority of Chinese Patent application Ser. No. 202111044344.9, filed on Sep. 7, 2021, the disclosures of which are hereby incorporated by reference in their entireties.

TECHNICAL FIELD

The present disclosure relates to a field of information technology, and more particularly, to an interface display method and apparatus, an electronic device and a storage medium.

BACKGROUND

With rapid development of mobile terminal technology and mobile network technology, shopping online anytime and anywhere has become a trend.

However, when a user purchases clothing or shoes online, the user cannot see a try-on effect. With respect to the problem, some shopping malls set up an AR (Augmented Reality) try-on function, so that the user may perform AR try-on to experience a try-on effect.

However, currently in AR related applications, most User Interfaces (UIs) are two-dimensional UIs.

SUMMARY

In order to solve the above-described technical problems or at least partially solve the above-described technical problems, embodiments of the present disclosure provide an interface display method and apparatus, an electronic device and a storage medium, realizing the display of a curved interface, which is conducive to enhancing visual effects.

In a first aspect, embodiments of the present disclosure provide an interface display method including:

displaying a curved interface in response to a preset operation, in which the curved interface includes at least one piece of first item information; and controlling the at least one piece of first item information moving along a set direction in response to a trigger operation acting on the curved interface.

In a second aspect, embodiments of the present disclosure provide an interface display apparatus including:

a first display module, configured to display a curved interface in response to a preset operation, in which the curved interface includes at least one piece of first item information; and a first control module, configured to control the at least one piece of first item information moving along a set direction in response to a trigger operation acting on the curved interface.

In a third aspect, embodiments of the present disclosure provide an electronic device including:

one or more processors;

a storage apparatus, configured to store one or more programs;

the one or more programs, when executed by the one or more processors, cause the one or more processors to implement the interface display method as described above.

In a fourth aspect, embodiments of the present disclosure provide a computer-readable storage medium storing a computer program, and the program, when executed by a processor, implements the interface display method as described above.

The technical solutions provided in the embodiments of the present disclosure have at least advantages below as compared with the prior art:

In the interface display method provided by the embodiments of the present disclosure, the curved interface is displayed in response to a preset operation; the curved interface includes at least one piece of first item information; the at least one piece of first item information is controlled moving along a set direction in response to a trigger operation acting on the curved interface, realizing the display of the curved interface, which is conducive to enhancing visual effects.

BRIEF DESCRIPTION OF THE DRAWINGS

The above-described and other features, advantages and aspects of the respective embodiments of the present disclosure will become more apparent by combining the accompanying drawings and referring to the detailed description below. Throughout the drawings, same or similar reference signs refer to same or similar elements. It should be understood that, the drawings are schematic and that originals and elements are not necessarily drawn to scale.

DETAILED DESCRIPTION

Figure 1:
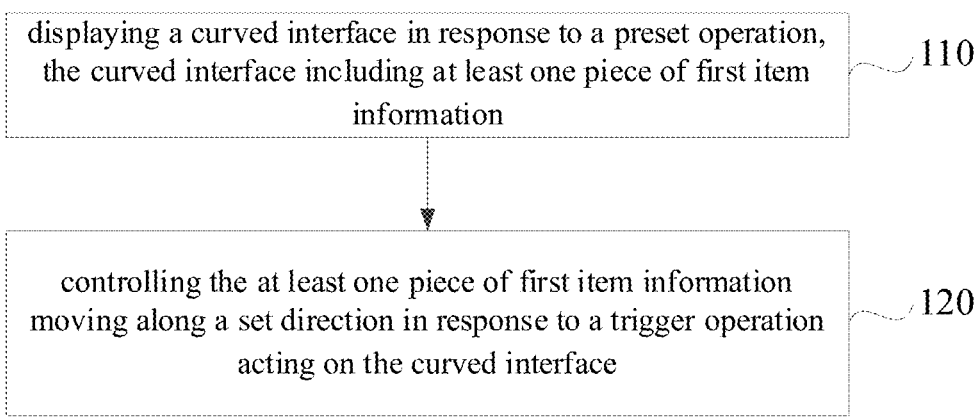
FIG. 1 is a flow chart of an interface display method according to an embodiment of the present disclosure.

Embodiments of the present disclosure will be described in more detail below with reference to the accompanying drawings. Although some embodiments of the present disclosure are shown in the drawings, it should be understood that the present disclosure may be implemented in various forms and should not be construed as limited to the embodiments set forth here. On the contrary, these embodiments are provided for a more thorough and complete understanding of the present disclosure. It should be understood that the drawings and embodiments of the disclosure are only for illustrative purposes, and are not intended to limit the protection scope of the disclosure.

It should be understood that the steps described in the method embodiments of the present disclosure may be performed in different order and/or in parallel. In addition, the method embodiments may include additional steps and/or omit the steps shown. The scope of the present disclosure is not limited in this respect.

As used herein, the term "including" and its variations are open including, that is, "including but not limited to". The term "based on" means "at least partially based on". The term "one embodiment" means "at least one embodiment"; the term "another embodiment" means "at least one other embodiment"; the term "some embodiments" means "at least some embodiments". Relevant definitions of other terms will be given in the following description.

It should be noted that the concepts of "first" and "second" mentioned in the disclosure are only used to distinguish devices, modules or units, and are not used to limit that these devices, modules or units must be different devices, modules or units, nor to limit the order or interdependence of the functions performed by these devices, modules or units.

It should be noted that the modification "one" and "a plurality" mentioned in this disclosure are illustrative rather than restrictive, and those skilled in the art should understand that unless the context clearly indicates otherwise, they should be understood as "one or more".

The names of interactive messages or information between a plurality of devices in the embodiment of the present disclosure are for illustrative purposes only and should not restrict the scope of the messages or information.

FIG. 1 is a flow chart of an interface display method according to an embodiment of the present disclosure. The method may be executed by an interface display apparatus; the apparatus may be implemented through software and/or hardware; the apparatus may be configured in an electronic device, for example, a display terminal, specifically including but not limited to, a smartphone, a palmtop computer, a tablet personal computer, a portable wearable device, a smart home device (e.g., a desk lamp), and other electronic device having a display screen and a camera.

As shown in FIG. 1, the method may specifically include the following steps:

Step 110: displaying a curved interface in response to a preset operation, the curved interface including at least one piece of first item information.

The preset operation may specifically be an operation of opening a certain video application. Specifically, when a user opens a video application, a curved interface is displayed on a homepage of the video application, and the curved interface includes at least one piece of first item information. In other words, a UI of a video playback page is a curved interface rather than a regular flat interface. The first item information may be image, price, purchase control, or AR try-on control of a product sold in live streaming sales.

Figure 2:
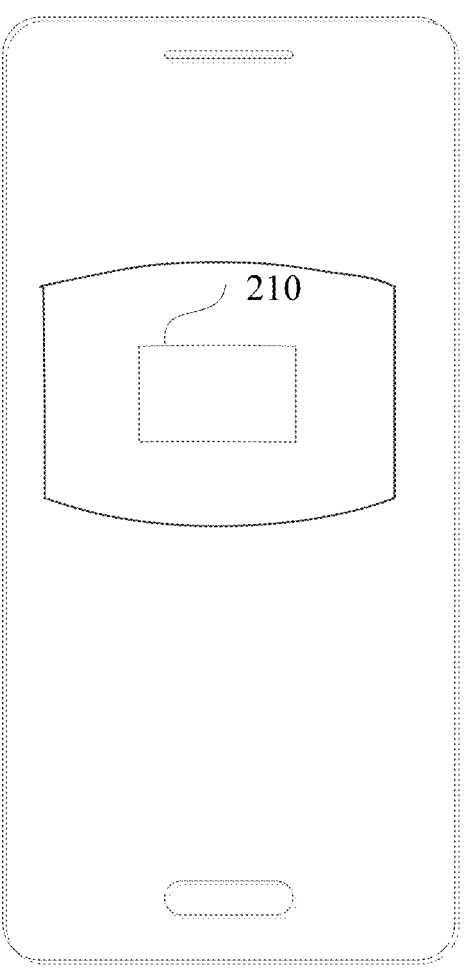
FIG. 2 is a schematic diagram of a page displaying a curved interface according to an embodiment of the present disclosure.

In one implementation, referring to a page schematic diagram displaying a curved interface as shown in FIG. 2, the curved interface includes at least one piece of first item information 210.

It should be noted that a terminal display screen used to display the curved interface is a flat screen rather than a curved screen; and the curved interface according to the embodiment is implemented through software rather than a hardware curved screen.

Figure 3:
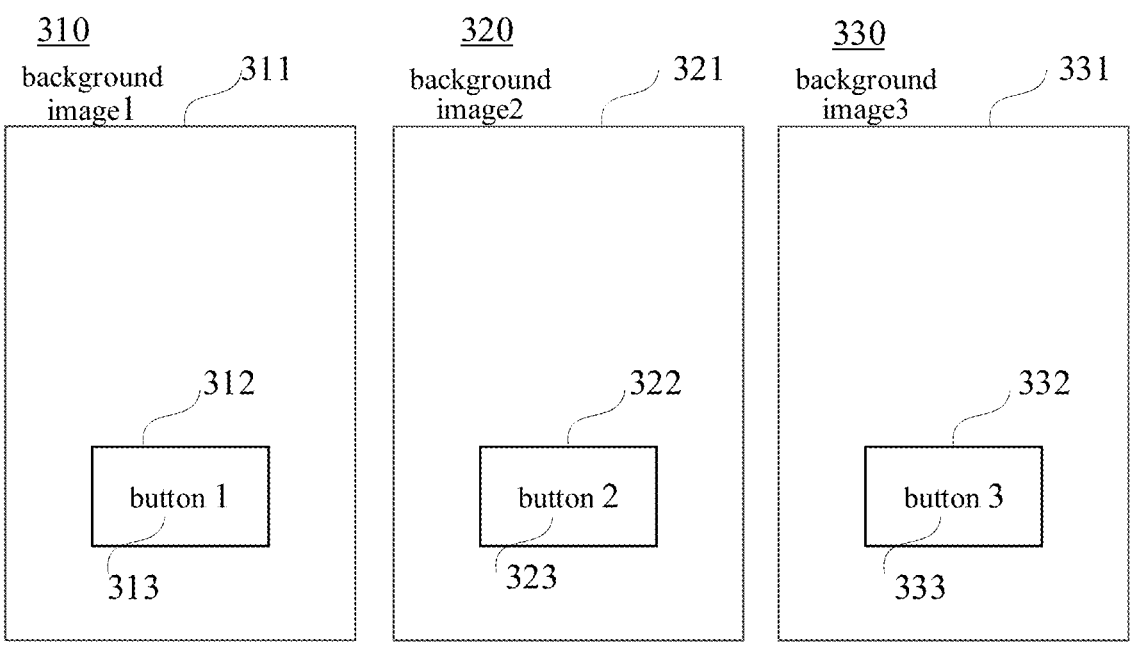
FIG. 3 is a schematic diagram of a display effect of a 2D UI for three types of first item information according to an embodiment of the present disclosure.
Figure 4:
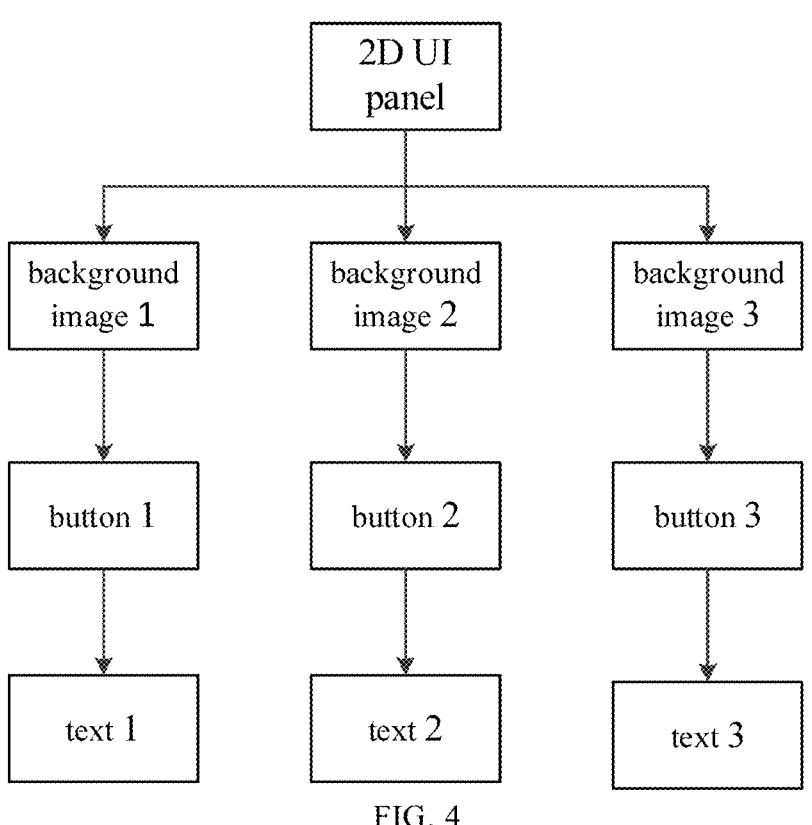
FIG. 4 is a schematic diagram of composition of a 2D UI panel according to an embodiment of the present disclosure.
Figure 5:
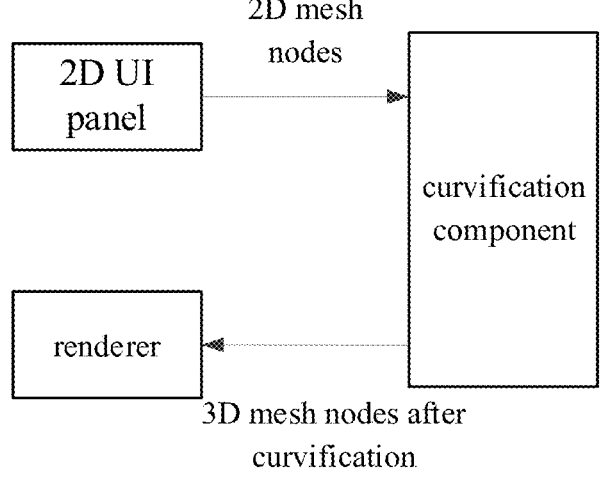
FIG. 5 is a schematic flow chart of implementing a curved interface according to an embodiment of the present disclosure.
Figure 6:
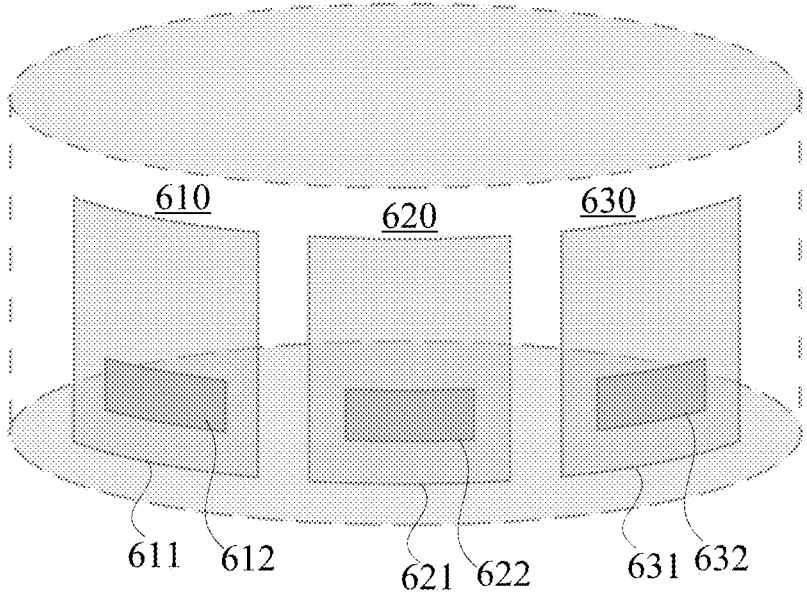
FIG. 6 is a schematic diagram of a display effect of a 3D UI for three types of first item information according to an embodiment of the present disclosure.

In some implementations, referring to a schematic diagram of a display effect of a 2D UI (i.e. a two-dimensional user interface) for three types of first item information shown in FIG. 3, first item information 310 includes background image 311, button 1 312, and text 313; first item information 320 includes background image 321, button 1 322, and text 323; first item information 330 includes background image 331, button 1 332, and text 333. Taking a 2D UI panel as a root node, as shown in FIG. 4, FIG. 4 shows a schematic diagram of composition of the 2D UI panel corresponding to FIG. 3, the 2D UI panel includes a plurality of UI sub-node elements (each sub-node element is an element to be rendered), which are specifically background image 1, background image 2, and background image 3; the background image 1 further includes button 1, the background image 2 further includes button 2, and the background image 3 further includes button 3; the button 1 includes text 1, the button 2 includes text 2, and the button 3 includes text 3. Based on the 2D UI, 2D mesh nodes of each element to be rendered may be determined. When displaying the curved interface, the 2D mesh nodes of a plurality of UI sub-nodes collected by the 2D UI panel may be provided to a curvification component, and the curvification component completes implementation of the curved interface. Refer to the schematic flow chart of implementing the curved interface as shown in FIG. 5, the 2D UI panel sends collected 2D render node data to the curvification component, the curvification component determines 3D render node data based on the 2D render node data, the 3D render node data is data after curvification; and then the data after curvification is submitted to a renderer for rendering, so as to implement a visual effect of 3D curvification, that is, implement display of the curved interface. Referring to the schematic diagram of a display effect of a 3D UI (i.e. a three-dimensional user interface) for three types of first item information as shown in FIG. 6, that is, the schematic diagram of a plurality of element to be rendered after curvification, which corresponds to the display effect of the 2D UI for the three types of first item information shown in FIG. 3, the 3D UI includes first item information 610, first item information 620 and first item information 630, the first item information 610 includes background image 611 and button 1 612, the first item information 620 includes background image 621 and button 2 622, and the first item information 630 includes background image 631 and button 3 632.

Figure 7:
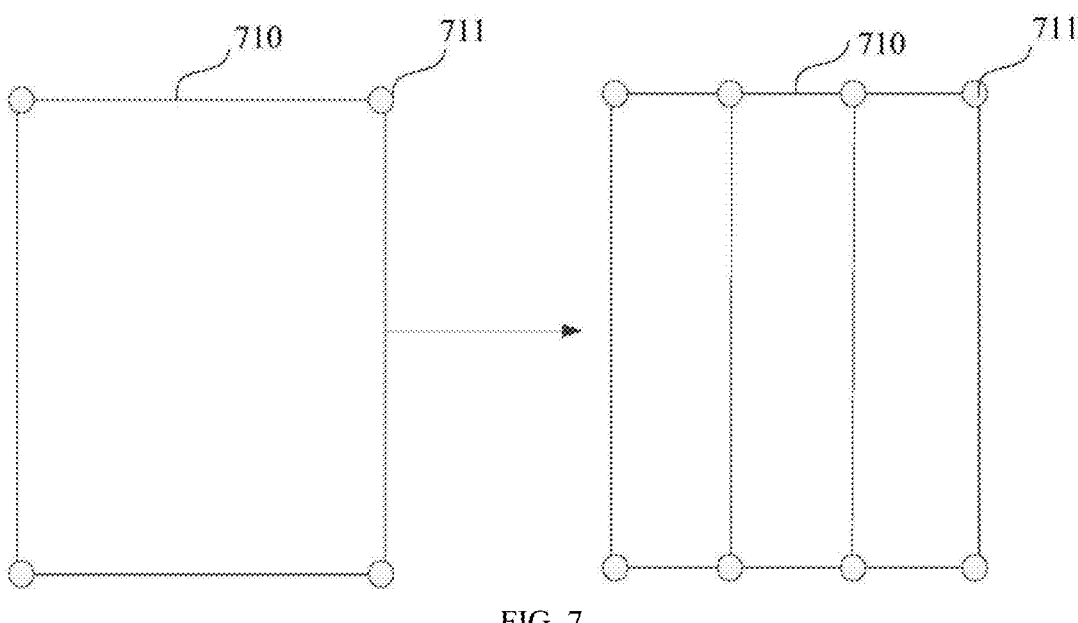
FIG. 7 is a schematic diagram of 2D mesh nodes of an element to be rendered according to an embodiment of the present disclosure.
Figure 8:
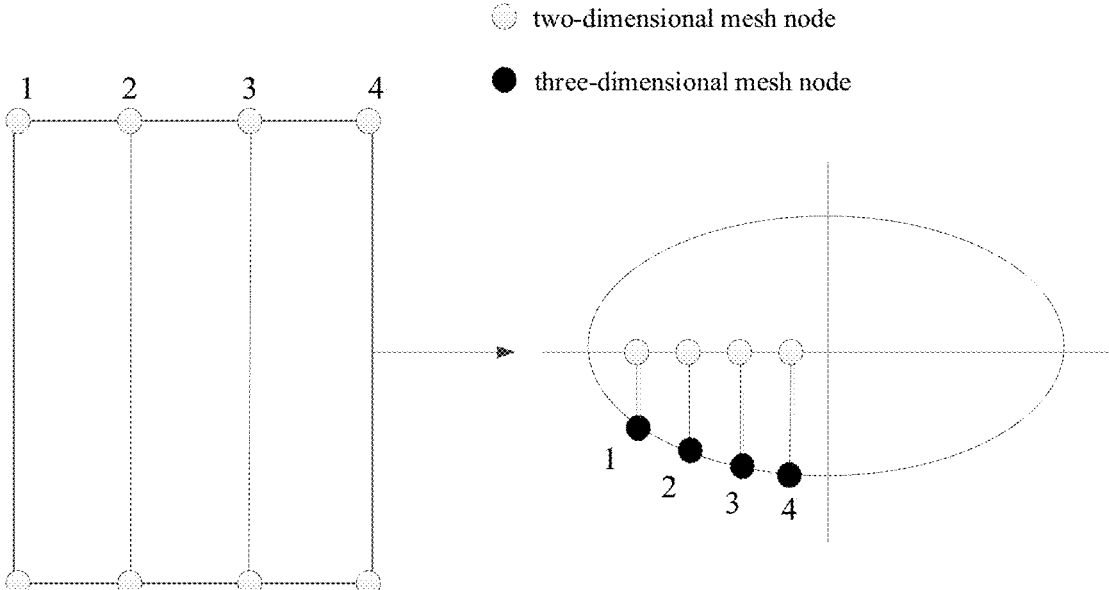
FIG. 8 is a schematic diagram of three-dimensional mesh nodes according to an embodiment of the present disclosure.

Specifically, 2D mesh nodes of each element to be rendered may be determined based on the 2D UI panel. Referring to the schematic diagram of 2D mesh nodes of an element to be rendered as shown in FIG. 7, in order to ensure smoothness of the curved surface, 2D mesh nodes 711 with a preset count may be determined based on a shape of the element to be rendered 710, that is, more 2D mesh nodes are provided during curvification of the element to be rendered, to ensure smoothness of the curved surface. After obtaining the 2D mesh nodes of the element to be rendered, the 2D mesh nodes of the element to be rendered are respectively mapped to a preset curved surface, that is, three-dimensional node reconstruction is performed based on the two-dimensional mesh nodes, to obtain the three-dimensional mesh nodes, and then the three-dimensional mesh nodes are submitted to the renderer for rendering, so as to obtain the display effect of the curved interface. Referring to the schematic diagram of the three-dimensional mesh nodes obtained by three-dimensional node reconstruction based on the two-dimensional mesh nodes shown in FIG. 8, FIG. 8 shows a top view of a cylinder, the two-dimensional mesh nodes may be respectively mapped to corresponding positions on a curved surface of the cylinder through a certain conversion relationship.

Specifically, displaying a curved interface in response to a preset operation, in which the curved interface includes at least one piece of first item information, includes: determining an element to be rendered based on the at least one piece of first item information; determining two-dimensional (also referred to as 2D) mesh nodes of the element to be rendered; performing three-dimensional (also referred to as 3D) node reconstruction based on the two-dimensional mesh nodes, to obtain three-dimensional mesh nodes; and performing a render operation based on the three-dimensional mesh nodes, to display the curved interface. Determining the two-dimensional mesh nodes of the element to be rendered includes: determining two-dimensional mesh nodes with a preset count based on a shape feature of the element to be rendered. Performing three-dimensional node reconstruction based on the two-dimensional mesh nodes, to obtain three-dimensional mesh nodes, includes: determining mapping points of the two-dimensional mesh nodes on a side face of a preset cylinder according to a preset rule; and determining the mapping points as the three-dimensional mesh nodes.

Step 120: controlling the at least one piece of first item information moving along a set direction in response to a trigger operation acting on the curved interface.

The trigger operation acting on the curved interface may be a sliding operation from right to left on the curved interface, or a sliding operation from left to right on the curved interface. Correspondingly, if the trigger operation is the sliding operation from right to left on the curved interface, the at least one piece of first item information is controlled sliding from right to left; if the trigger operation is the sliding operation from left to right on the curved interface, the at least one piece of first item information is controlled sliding from left to right.

Further, when controlling the at least one piece of first item information moving along the set direction, the method further includes:

displaying second item information on the curved interface;

item information closer to a preset position of the curved interface is displayed larger, item information farther from the preset position of the curved interface is displayed smaller, that is, item information look larger when closer and smaller when farther, so as to achieve the purpose of improving a visual effect.

Exemplarily, the first item information and/or the second item information include at least one of: shoe image, shoe value information, shoe acquisition control, and augmented reality AR try-on control. The method further includes: displaying a try-on interface in response to a trigger operation acting on the AR try-on control, a foot of a user is displayed on the try-on interface, and a three-dimensional model of a shoe to be tried on is rendered to the foot of the user. By displaying relevant information about shoes for sale on the curved interface, user shopping immersion may be enhanced. Specifically, the three-dimensional model of the shoe may be stored in a form of file package on the server. when the client needs to invoke the three-dimensional model of the shoe, the client may acquire the corresponding three-dimensional model from the server. In some implementations, in order to implement a virtual try-on function on the client, a file package including a three-dimensional model of the shoes is pre-stored on the server that cooperates with the client; the file package may further include at least one of the following resources: a map sub-file of the shoe, a model sub-file of the shoe, a material resource file, a calf model, a rendering component, a pose component, and a reference relationship between the rendering component and the respective files; for example, the material resource file refers to the map sub-file, the rendering component refers to the model sub-file and the material resource file, the pose component refers to a foot detection algorithm, etc., so that the server cooperates with the client and implements the virtual try-on function on the client based on the file package. Specifically, during a virtual try-on process on the client, the foot position and posture of the user may be acquired in real time through the pose component, and the rendering component renders a three-dimensional model of the shoe according to the foot position and posture of the user.

The method further includes: displaying an acquisition page of a shoe in response to a trigger operation acting on the shoe acquisition control, so that a user acquires the shoe based on the acquisition page. The shoe acquisition control may be displayed on a shoe try-on interface. If the user feels satisfied after trying on, one click purchase may be implemented on the try-on interface, which greatly facilitates purchase by the user.

Figure 9:
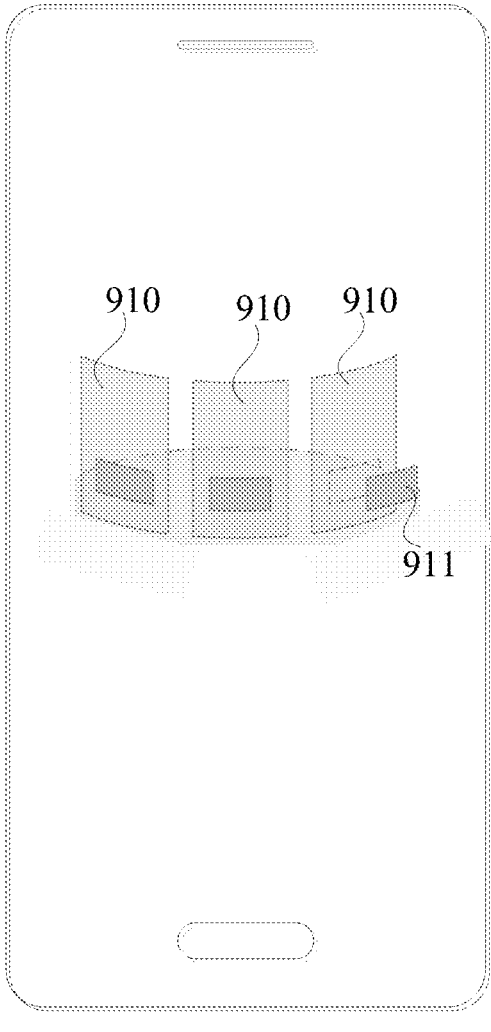
FIG. 9 is a schematic diagram of a control floating out the curved interface according to an embodiment of the present disclosure.

Further, the method further includes: controlling the first item information to float out of the curved interface in response to a trigger operation acting on the first item information. Taking the first item information as a certain control, if the user triggers the control, or has a mouse hover over the control, the control will float out of the curved interface, to enhance an interaction effect. In terms of technical implementation, a coordinate of the element displayed on the curved interface on a Z-axis is 0; in order to control the element to float out of the curved interface, the coordinate of the element on the Z-axis should be enlarged to a set value and then re-rendered, so as to implement the effect of floating out of the curved interface. Exemplarily, referring to a schematic diagram of a control floating out the curved interface as shown in FIG. 9, which includes curved interface 910 and control 920 displayed on the curved interface 910. When the user triggers the control 920 or has the mouse hover over the control 920, the control 920 floats out of the curved interface 910.

In the interface display method provided by the embodiments of the present disclosure, the curved interface is displayed in response to the preset operation, the curved interface includes at least one piece of first item information; the at least one piece of first item information is controlled moving along the set direction in response to the trigger operation acting on the curved interface, realizing the display of the curved interface, which is conducive to enhancing visual effects.

Figure 10:
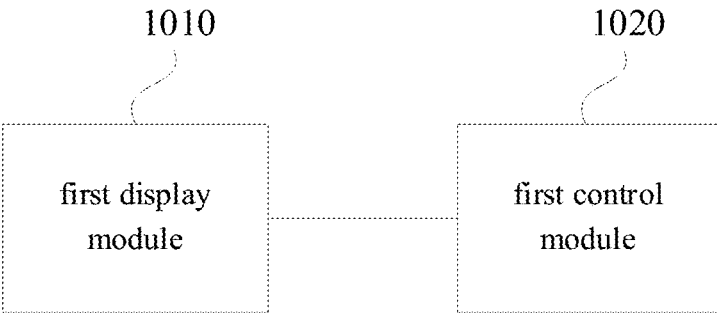
FIG. 10 is a structural schematic diagram of an interface display apparatus according to an embodiment of the present disclosure.

FIG. 10 is a structural schematic diagram of an interface display apparatus according to an embodiment of the present disclosure. As shown in FIG. 10, the interface display apparatus specifically includes: a first display module 1010 and a first control module 1020.

The first display module 1010 is configured to display a curved interface in response to a preset operation, in which the curved interface includes at least one piece of first item information; and the first control module 1020 is configured to control the at least one piece of first item information moving along a set direction in response to a trigger operation acting on the curved interface.

Optionally, the interface display apparatus further includes: a second display module, configured to display second item information on the curved interface; item information closer to a preset position of the curved interface is displayed larger, item information farther from the preset position of the curved interface is displayed smaller.

Optionally, the first display module 1010 includes: a first determining unit configured to determine an element to be rendered based on the at least one piece of first item information, a second determining unit configured to determine the two-dimensional mesh nodes of the element to be rendered; a reconstructing unit configured to perform three-dimensional node reconstruction based on the two-dimensional mesh nodes, to obtain three-dimensional mesh nodes, and a rendering unit configured to perform a render operation based on the three-dimensional mesh nodes, to display the curved interface.

Optionally, the second determining unit is configured to determine two-dimensional mesh nodes with a preset count based on a shape feature of the element to be rendered.

Optionally, the reconstructing unit is configured to: determine mapping points of the two-dimensional mesh nodes on a side face of a preset cylinder according to a preset rule; and determine the mapping points as the three-dimensional mesh nodes.

Optionally, the first item information and/or the second item information include at least one of: shoe image, shoe value information, shoe acquisition control, and augmented reality AR try-on control.

Optionally, the interface display apparatus further includes a switching module which is configured to display a try-on interface in response to a trigger operation acting on the AR try-on control, a foot of a user is displayed on the try-on interface, and a three-dimensional model of a shoe to be tried on is rendered to the foot of the user.

Optionally, the interface display apparatus further includes a third display module which is configured to display an acquisition page of a shoe in response to a trigger operation acting on the shoe acquisition control, so that a user acquires the shoe based on the acquisition page.

Optionally, the interface display apparatus further includes a second control module which is configured to control the first item information to float out of the curved interface in response to a trigger operation acting on the first item information.

The interface display apparatus provided by the embodiment of the present disclosure implements display of the curved interface, which is conducive to improving the visual effect and enhancing immersion of the user's viewing experience.

The interface display apparatus provided by the embodiment of the present disclosure may execute the steps in the interface display method provided by the method embodiment of the present disclosure, and specific execution steps and advantageous effects will not be repeated here.

Figure 11:
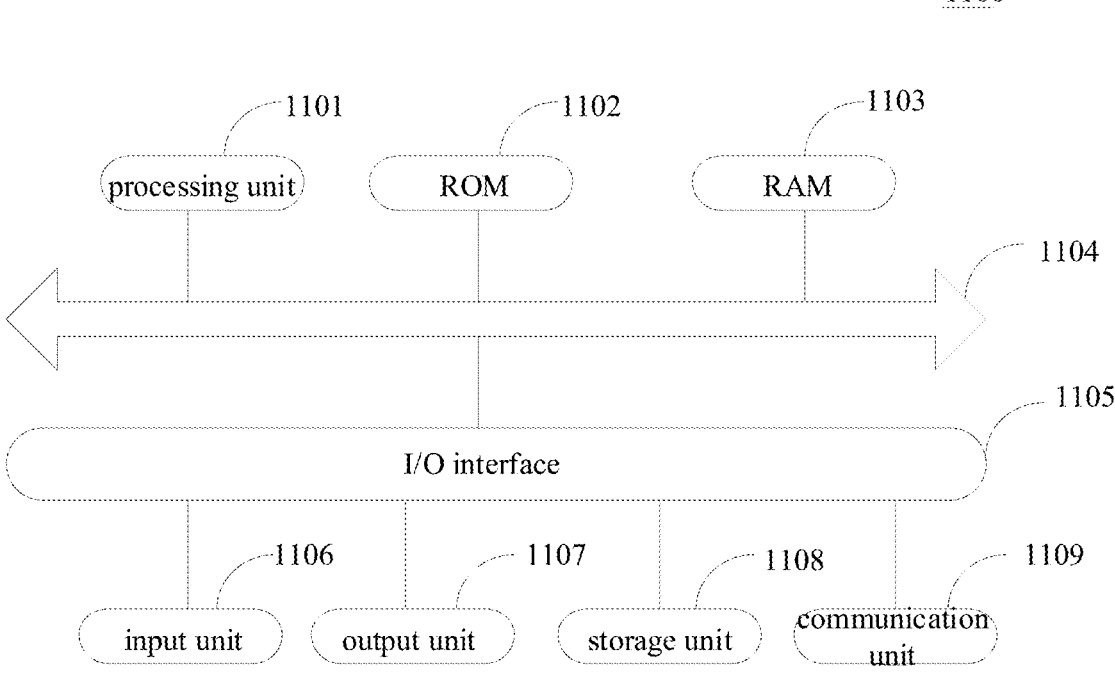
FIG. 11 is a structural schematic diagram of an electronic device according to an embodiment of the present disclosure.

FIG. 11 is a structural schematic diagram of an electronic device provided by an embodiment, Specifically, refer to FIG. 11, which shows the structural schematic diagram of an electronic device 1100 for implementing the embodiment of the present disclosure. The electronic device 1100 in the embodiment of the present disclosure may include but not limited to mobile terminals such as mobile phone, laptop, digital radio receiver, personal digital assistant (PDA), portable android device (PAD), portable multimedia player (PMP), car terminal (such as car navigation terminal) and wearable electronic devices and fixed terminals such as digital TV, desktop computer and smart home devices. The electronic device as shown in FIG. 11 is only an example and should not restrict the functions and the scope of use of the embodiments of the present disclosure.

As shown in FIG. 11, the electronic device 1100 may include the processing unit (e.g., a central processing unit (CPU), a graphics processing unit (GPU)) 1101, which may execute various appropriate actions and processes according to programs stored in the ROM 1102 or programs loaded to the RAM 1103 from the storage unit 1108 to implement the method as described in embodiments of the present disclosure. A plurality of programs and data required for the operation of the electronic device 1100 are also stored in the RAM 1103. The processing unit 1101, the ROM 1102 and the RAM 1103 are connected with each other through a bus 1104. An input/output (I/O) interface 1105 is also connected to the bus 1104.

In general, the following units may be connected to the I/O interface 1105: an input unit 1106 including a touch screen, a touch pad, a keyboard, a mouse, a camera, a microphone, an accelerometer, a gyroscope and the like; an output unit 1107 including a liquid crystal display (LCD), a loudspeaker, a vibrator and the like; a storage unit 1108 including magnetic tapes and hard disks; and a communication unit 1109. The communication unit 1109 may allow the electronic device 1100 to communicate wirelessly in a wired manner with other devices to exchange data. Although FIG. 11 shows the electronic device 1100 including a plurality of units, it should be understood that not all the shown units are required to be implemented or included. More or less units may be implemented alternatively or included.

Particularly, according to the embodiments of the present disclosure, the processes described above with reference to the flowcharts may be implemented as computer software programs. For instance, the embodiment of the present disclosure provides a computer program product, which includes computer programs hosted on a non-transient computer readable medium. The computer programs contain program codes for executing the method as shown in the flowchart, thereby implementing the method as described above. In the embodiment, the computer programs may be unloaded and installed from the internet through the communication unit 1109, or installed from the storage unit 1108, or installed from the ROM 1102. The above functions defined in the method provided by the embodiment of the present disclosure are executed when the computer programs are executed by the processing unit 1101.

It should be noted that the above computer readable medium of the present disclosure may be a computer readable signal medium, a computer readable storage medium, or any combination of the above. The computer readable storage medium, for instance, may be, but not limited to, electrical, magnetic, optical, electromagnetic, infrared, or semiconductor system, device, or equipment, or a combination of the above. A more specific example of the computer readable storage medium may include but not limited to: electrical connection having one or more wires, portable computer disk, hard disk, RAM, ROM, erasable programmable read-only memory (EPROM), flash memory, optical fiber, portable compact disk read-only memory (CD-ROM), optical storage unit, magnetic storage unit, or any suitable combination of the above. In the present disclosure, the computer readable storage medium may be any tangible medium containing or storing programs. The programs may be used by a command execution system, device or unit or used in combination with the command execution system, device or unit. However, in the present disclosure, the computer readable signal medium may include data signals propagated in baseband or as part of carrier, wherein computer readable program codes are hosted. The propagated data signals may adopt a plurality of forms, including but not limited to electromagnetic signals, optical signals or any suitable combination of the above. The computer readable signal medium may also be any computer readable medium except the computer readable storage medium. The computer readable signal medium can send, propagate or transmit programs used by the command execution system, device or unit or used in combination with the command execution system, device or unit. The program codes contained in the computer readable medium can be transmitted by any appropriate medium, including but not limited to: wire, optical cable, radio frequency (RF) and the like, or any suitable combination of the above.

In some embodiments, the client and the server may communicate by utilization of any network protocol which is currently known or developed in the future such as hypertext transfer protocol (HTTP), and may be interconnected with digital data communication (e.g., communication network) in any form or medium. The example of the communication network includes local area network (LAN), wide area network (WAN), internet, end-to-end network (e.g., ad hoc end-to-end network), and any network which is current known or developed in the future.

The above computer readable medium may be contained in the above electronic device and may also exist alone and not be assembled into the electronic device.

The above computer readable medium hosts one or more programs. When the above one or more programs are executed by the electronic device, the electronic device is configured to:

display a curved interface in response to a preset operation, in which the curved interface includes at least one piece of first item information; and control the at least one piece of first item information moving along a set direction in response to a trigger operation acting on the curved interface.

Optionally, when one or more of the above programs are executed by the electronic device, the electronic device may also perform other steps described in the above embodiments.

Computer program codes for performing the operations of the present disclosure may be written in one or more programming languages or a combination thereof. The above programming languages include but not limited to object-oriented programming languages such as Java, Smalltalk and C++, and also include conventional procedural programming languages such as "C" language or similar programming languages. The program codes may be completely executed on a user computer, partially executed on the user computer, executed as a separate package, partially executed on the user computer and partially executed on a remote computer, or completely executed on the remote computer or the server. In the case when the remote computer is involved, the remote computer may be connected to the user computer through any kind of network including LAN or WAN, or can be connected to an external computer (for instance, connected via the Internet by utilization of Internet service providers).

The flowcharts and the block diagrams in the drawings show possible architectures, functions and operations of the system, the method and the computer program product according to the embodiments of the present disclosure. In this regard, each block in the flowchart or the block diagram may represent a module, a program segment, or a part of code. The module, the program segment, or the part of the code contains one or more executable instructions for implementing specified logic functions. It should be also noted that in some alternative implementations, the functions marked in the blocks may also occur in a different order from those marked in the drawings. For instance, two consecutive blocks may actually be executed basically in parallel, and sometimes, may also be executed in a reverse order, determined by involved functions. It should be also noted that each block in the block diagram and/or the flowchart and the combination of the blocks in the block diagram and/or the flowchart may be implemented by a dedicated hardware-based system that performs a specified function or operation, and may also be implemented by the combination of a special hardware and computer instructions.

Units involved in the embodiments of the present disclosure may be implemented by software, and may also be implemented by hardware. Wherein, the name of the unit should not define the unit under certain circumstances.

The functions described above in this document may be at least partially executed by one or more hardware logical units. For instance, without limitation, demonstration type hardware logical units that may be used include: field programmable gate array (FPGA), application-specific integrated circuit (ASIC), application specific standard parts (ASSP), system on a chip (SOC), complex programmable logic device (CPLD), etc.

In the context of the present disclosure, the machine readable medium may be a tangible medium and may include or store programs used by command execution system, device or equipment or used in combination with the command execution system, device or equipment. The machine readable medium may be a machine readable signal medium or a machine readable storage medium. The machine readable medium may include but not limited to electronic, magnetic, optical, electromagnetic, infrared, or semiconductor system, device or equipment, or any suitable combination of the above. A more specific example of the machine readable storage medium may include electrical connection based on one or more wires, portable computer disk, hard disk, RAM, ROM, EPROM, flash memory, optical fiber, CD-ROM, optical storage unit, magnetic storage unit, or any suitable combination of the above.

According to one embodiment or a plurality of embodiments of the present disclosure, the present disclosure provides an interface display method, including: displaying a curved interface in response to a preset operation, in which the curved interface includes at least one piece of first item information; and controlling the at least one piece of first item information moving along a set direction in response to a trigger operation acting on the curved interface.

According to one embodiment or a plurality of embodiments of the present disclosure, the interface display method provided in the present disclosure, optionally, further includes: displaying second item information on the curved interface when controlling the at least one piece of first item information moving along the set direction; item information closer to a preset position of the curved interface is displayed larger, and item information farther from the preset position of the curved interface is displayed smaller.

According to one embodiment or a plurality of embodiments of the present disclosure, in the interface display method provided in the present disclosure, optional, displaying a curved interface in response to a preset operation, in which the curved interface includes at least one piece of first item information, includes: determining an element to be rendered based on the at least one piece of first item information; determining two-dimensional mesh nodes of the element to be rendered; performing three-dimensional node reconstruction based on the two-dimensional mesh nodes, to obtain three-dimensional mesh nodes; and performing a render operation based on the three-dimensional mesh nodes, to display the curved interface.

According to one embodiment or a plurality of embodiments of the present disclosure, in the interface display method provided in the present disclosure, optional, determining two-dimensional mesh nodes of the element to be rendered includes: determining two-dimensional mesh nodes with a preset count based on a shape feature of the element to be rendered.

According to one embodiment or a plurality of embodiments of the present disclosure, in the interface display method provided in the present disclosure, optional, performing three-dimensional node reconstruction based on the two-dimensional mesh nodes, to obtain three-dimensional mesh nodes, includes: determining mapping points of the two-dimensional mesh nodes on a side face of a preset cylinder according to a preset rule; and determining the mapping points as the three-dimensional mesh nodes.

According to one embodiment or a plurality of embodiments of the present disclosure, in the interface display method provided in the present disclosure, optional, the first item information and/or the second item information include at least one of: shoe image, shoe value information, shoe acquisition control, and augmented reality AR try-on control.

According to one embodiment or a plurality of embodiments of the present disclosure, the interface display method provided in the present disclosure, optional, further includes: displaying a try-on interface in response to a trigger operation acting on the AR try-on control, a foot of a user is displayed on the try-on interface, and a three-dimensional model of a shoe to be tried on is rendered to the foot of the user.

According to one embodiment or a plurality of embodiments of the present disclosure, the interface display method provided in the present disclosure, optional, further includes: displaying an acquisition page of a shoe in response to a trigger operation acting on the shoe acquisition control, so that a user acquires the shoe based on the acquisition page.

According to one embodiment or a plurality of embodiments of the present disclosure, the interface display method provided in the present disclosure, optional, further includes: controlling the first item information to float out of the curved interface in response to a trigger operation acting on the first item information.

According to one embodiment or a plurality of embodiments of the present disclosure, the present disclosure provides an interface display apparatus, including: a first display module, configured to display a curved interface in response to a preset operation, in which the curved interface includes at least one piece of first item information; and a first control module, configured to control the at least one piece of first item information moving along a set direction in response to a trigger operation acting on the curved interface.

According to one embodiment or a plurality of embodiments of the present disclosure, the interface display apparatus provided in the present disclosure, optional, further includes: a second display module, configured to display second item information on the curved interface; item information closer to a preset position of the curved interface is displayed larger, item information farther from the preset position of the curved interface is displayed smaller.

According to one embodiment or a plurality of embodiments of the present disclosure, in the interface display apparatus provided in the present disclosure, optional, the first display module includes: a first determining unit configured to determine an element to be rendered based on the at least one piece of first item information, a second determining unit configured to determine the two-dimensional mesh nodes of the element to be rendered; a reconstructing unit configured to perform three-dimensional node reconstruction based on the two-dimensional mesh nodes, to obtain three-dimensional mesh nodes, and a rendering unit configured to perform a render operation based on the three-dimensional mesh nodes, to display the curved interface.

According to one embodiment or a plurality of embodiments of the present disclosure, in the interface display apparatus provided in the present disclosure, optional, the second determining unit is configured to determine two-dimensional mesh nodes with a preset count based on a shape feature of the element to be rendered.

According to one embodiment or a plurality of embodiments of the present disclosure, in the interface display apparatus provided in the present disclosure, optional, the reconstructing unit is configured to: determine mapping points of the two-dimensional mesh nodes on a side face of a preset cylinder according to a preset rule; and determine the mapping points as the three-dimensional mesh nodes.

According to one embodiment or a plurality of embodiments of the present disclosure, in the interface display apparatus provided in the present disclosure, optional, the first item information and/or the second item information include at least one of: shoe image, shoe value information, shoe acquisition control, and augmented reality AR try-on control.

According to one embodiment or a plurality of embodiments of the present disclosure, the interface display apparatus provided in the present disclosure, optional, further includes: a switching module which is configured to display a try-on interface in response to a trigger operation acting on the AR try-on control, a foot of a user is displayed on the try-on interface, and a three-dimensional model of a shoe to be tried on is rendered to the foot of the user.

According to one embodiment or a plurality of embodiments of the present disclosure, the interface display apparatus provided in the present disclosure, optional, further includes: a third display module which is configured to display an acquisition page of a shoe in response to a trigger operation acting on the shoe acquisition control, so that a user acquires the shoe based on the acquisition page.

According to one embodiment or a plurality of embodiments of the present disclosure, the interface display apparatus provided in the present disclosure, optional, further includes: a second control module which is configured to control the first item information to float out of the curved interface in response to a trigger operation acting on the first item information.

According to one embodiment or a plurality of embodiments of the present disclosure, the present disclosure provides an electronic device including:

one or more processors;

a storage apparatus, configured to store one or more programs;

the one or more programs, when executed by the one or more processors, cause the one or more processors to implement any interface display method provided in the present disclosure.

According to one embodiment or a plurality of embodiments of the present disclosure, the present disclosure provides a computer-readable storage medium, storing a computer program, the program, when executed by a processor, implements any interface display method provided in the present disclosure.

According to one embodiment or a plurality of embodiments of the present disclosure, the present disclosure provides a computer program product, which includes a computer program or instruction, the computer program or instruction, when executed by a processor, implements any interface display method provided in the present disclosure.

The above description is only the explanation of the better embodiment of the present disclosure and the used technical principle. It should be understood by those skilled in the art that the disclosure scope involved in the disclosure is not limited to the technical solution formed by the specific combination of the above technical features, but also covers other technical solutions formed by any combination of the above technical features or their equivalent features without departing from the above disclosed concept. For example, the technical solution formed by replacing the above features with (but not limited to) technical features with similar functions disclosed in the disclosure.

In addition, although the operations are depicted in a specific order, this should not be understood as requiring these operations to be performed in the specific order shown or in a sequential order. Under certain circumstances, multitasking and parallel processing may be beneficial. Similarly, although several specific implementation details are included in the above discussion, these should not be interpreted as limiting the scope of the present disclosure. Some features described in the context of separate embodiments may also be implemented in a single embodiment in combination. On the contrary, various features described in the context of a single embodiment may also be implemented in a plurality of embodiments alone or in any suitable subcombination.

Although the subject matter has been described in language specific to structural features and/or logical actions of methods, it should be understood that the subject matter defined in the appended claims is not necessarily limited to the specific features or actions described above. On the contrary, the specific features and actions described above are only example forms of realizing the claims.

The invention claimed is:

1. An interface display apparatus, comprising:

a first display module, configured to display a curved interface in response to a preset operation, the curved interface comprises at least one piece of first item information; and a first control module, configured to control the at least one piece of first item information moving along a set direction in response to a trigger operation acting on the curved interface, wherein the first display module comprises:

a first determining unit, configured to determine an element to be rendered based on the at least one piece of first item information;

a second determining unit, configured to determine two-dimensional mesh nodes of the element to be rendered;

a reconstructing unit, configured to perform three-dimensional node reconstruction based on the two-dimensional mesh nodes, to obtain three-dimensional mesh nodes; and a rendering unit, configured to perform a render operation based on the three-dimensional mesh nodes, to display the curved interface.

2. The apparatus according to claim 1, further comprising:

a second display module, configured to display second item information on the curved interface; wherein item information closer to a preset position of the curved interface is displayed larger, item information farther from the preset position of the curved interface is displayed smaller.

3. The apparatus according to claim 1, wherein the second determining unit is configured to:

determine two-dimensional mesh nodes with a preset count based on a shape feature of the element to be rendered.

4. The apparatus according to claim 1, wherein the reconstructing unit is configured to:

determine mapping points of the two-dimensional mesh nodes on a side face of a preset cylinder according to a preset rule; and determine the mapping points as the three-dimensional mesh nodes.

5. The apparatus according to claim 1, wherein the first item information and/or the second item information include at least one of: shoe image, shoe value information, shoe acquisition control, and augmented reality AR try-on control.

6. The apparatus according to claim 5, further comprising:

a switching module, configured to display a try-on interface in response to a trigger operation acting on the AR try-on control, a foot of a user is displayed on the try-on interface, and a three-dimensional model of a shoe to be tried on is rendered to the foot of the user.

7. The apparatus according to claim 5, further comprising:

a third display module, configured to display an acquisition page of a shoe in response to a trigger operation acting on the shoe acquisition control, so that a user acquires the shoe based on the acquisition page.

8. The apparatus according to claim 1, further comprising:

a second control module, configured to control the first item information to float out of the curved interface in response to a trigger operation acting on the first item information.

9. An interface display method, comprising:

displaying a curved interface in response to a preset operation, the curved interface comprises at least one piece of first item information; and controlling the at least one piece of first item information moving along a set direction in response to a trigger operation acting on the curved interface, wherein the displaying a curved interface in response to a preset operation comprises:

determining an element to be rendered based on the at least one piece of first item information;

determining two-dimensional mesh nodes of the element to be rendered;

performing three-dimensional node reconstruction based on the two-dimensional mesh nodes, to obtain three-dimensional mesh nodes; and performing a render operation based on the three-dimensional mesh nodes, to display the curved interface.

10. The method according to claim 9, further comprising:

displaying second item information on the curved interface when controlling the at least one piece of first item information moving along the set direction;

wherein item information closer to a preset position of the curved interface is displayed larger, item information farther from the preset position of the curved interface is displayed smaller.

11. The method according to claim 9, wherein determining two-dimensional mesh nodes of the element to be rendered comprises:

determining two-dimensional mesh nodes with a preset count based on a shape feature of the element to be rendered.

12. The method according to claim 9, wherein performing three-dimensional node reconstruction based on the two-dimensional mesh nodes, to obtain three-dimensional mesh nodes, comprises:

determining mapping points of the two-dimensional mesh nodes on a side face of a preset cylinder according to a preset rule; and determining the mapping points as the three-dimensional mesh nodes.

13. The method according to claim 9, wherein the first item information and/or the second item information comprise at least one of: shoe image, shoe value information, shoe acquisition control, and augmented reality AR try-on control.

14. The method according to claim 13, further comprising:

displaying a try-on interface in response to a trigger operation acting on the AR try-on control, a foot of a user is displayed on the try-on interface, and a three-dimensional model of a shoe to be tried on is rendered to the foot of the user.

15. The method according to claim 13, further comprising:

displaying an acquisition page of a shoe in response to a trigger operation acting on the shoe acquisition control, so that a user acquires the shoe based on the acquisition page.

16. The method according to claim 9, further comprising:

controlling the first item information to be displayed in a form of floating out of the curved interface in response to a trigger operation acting on the first item information.

17. An electronic device, comprising:

one or more processors;

a storage apparatus, configured to store one or more programs;

wherein the one or more programs, when executed by the one or more processors, cause the one or more processors to implement the method according to claim 9.

18. A non-transitory computer-readable storage medium, storing a computer program, wherein the computer program, when executed by a processor, implements the method according to claim 9.

* * * * *